United States Patent [19]
Stuckert

[11] 3,935,480
[45] Jan. 27, 1976

[54] BROAD BAND DIRECTIONAL SIGNAL GENERATOR

[75] Inventor: Paul E. Stuckert, Katonah, N.Y.

[73] Assignee: International Business Machines Corporation, Armonk, N.Y.

[22] Filed: June 28, 1974

[21] Appl. No.: 484,032

[52] U.S. Cl. .................................. 307/241; 333/6
[51] Int. Cl.² ...................................... H03K 17/00
[58] Field of Search ........ 333/10, 81, 75, 6; 330/53; 307/241

[56] References Cited
UNITED STATES PATENTS

| | | | |
|---|---|---|---|
| 3,372,350 | 3/1968 | Kawahashi et al. | 333/10 |
| 3,453,529 | 7/1969 | Richman | 333/81 |
| 3,458,836 | 7/1969 | Engelbrecht | 333/10 |
| 3,600,707 | 8/1971 | Friedman | 333/10 |

*Primary Examiner*—John S. Heyman
*Assistant Examiner*—B. P. Davis
*Attorney, Agent, or Firm*—Sughrue, Rothwell, Mion & Zinn

[57] ABSTRACT

The broad band directional signal generator disclosed generates signals on a transmission line, which, controllably propagate in one direction on the line to the exclusion of the other direction, or in both directions. Such signal generation may occur at one or a multiplicity of points located at arbitrary positions along the line. The signal generator includes a conventional $\pi$, 0, T, or H attenuator network and operates in conjunction with other circuitry. In the disclosed embodiments, symmetrical attenuators are used with either single ended or push-pull amplifiers connected to the attenuator nodes. The invention, however, is equally applicable to $\pi$, 0, T, or H attenuator networks which are not symmetrical. The specific embodiments shown employing active devices and direct coupling have wide frequency responses which are flat and flat to DC. Where operation down to DC is not required, AC or transformer coupling may be used. The circuits disclosed have applications in analog and digital communication paths where two-way information flow exists and where a multiplicity of ports may share the same path.

19 Claims, 9 Drawing Figures

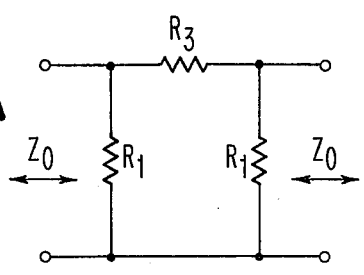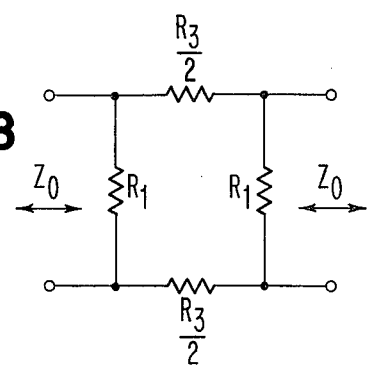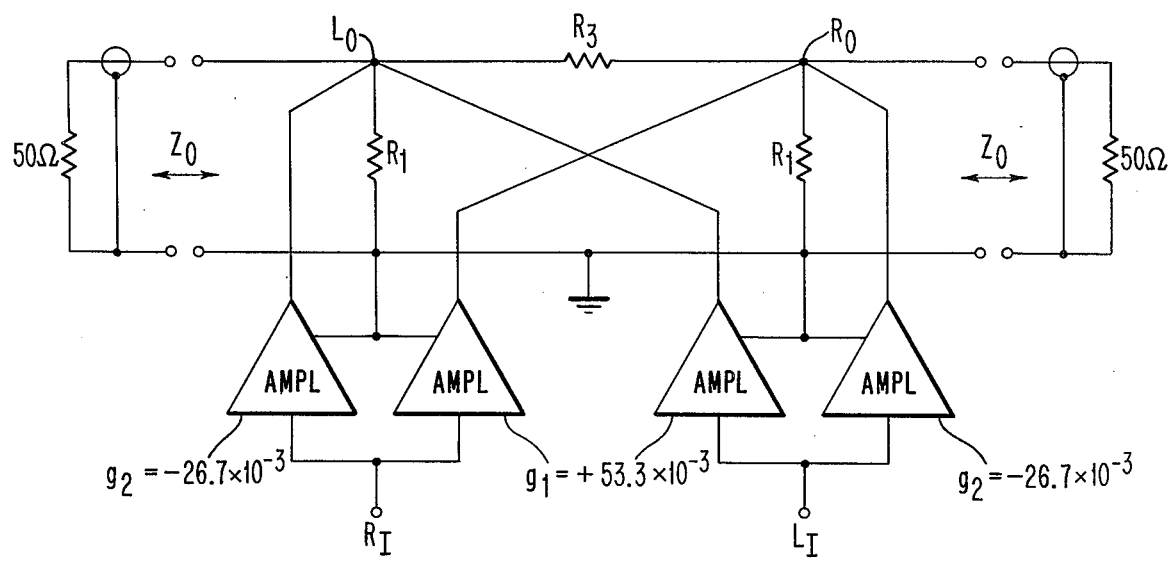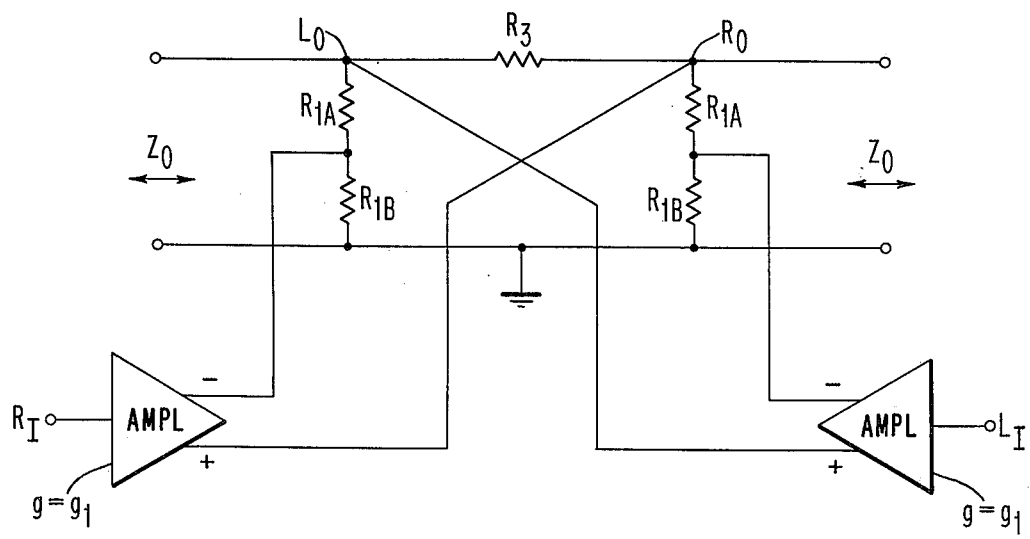

BROAD BAND DIRECTIONAL SIGNAL GENERATOR

BACKGROUND OF THE INVENTION

1. Field of the Invention

The present invention generally relates to signal generators, and more particularly, to a broad band directional signal generator capable of generating signals on a transmission line or the like which, controllably, propagate in one direction on the line to the exclusion of the other direction or in both directions.

2. Description of the Prior Art

Numerous narrow band directional couplers exist and are typically employed to split or mix signals in a single-signal path. Directional couplers generally employ reactive circuit elements and, as a result, their frequency response is severely limited. Since directional signal generators employ directional couplers, it follows that directional signal generators have in the past been narrow band and sometimes complex devices.

SUMMARY OF THE INVENTION

It is therefore an object of the present invention to provide a broad band directional signal generator employing a conventional attenuator composed of linear, nonreactive circuit elements and whose frequency response is flat and flat to DC.

It is another object of the invention to provide a broad band directional signal generator of uniquely simple construction and adapted for use in analog and digital communication paths where two-way information flow exists.

These and other objects of the invention are achieved by providing a directional signal generator incorporating a conventional attenuator network which operates in conjunction with other circuitry. The attenuator network may be a $\pi$ or 0, T or H network and may be either symmetrical or unsymmetrical. The attenuator network is composed only of linear, nonreactive circuit elements and is readily adapted to incorporation in coaxial, microstrip and stripline structures, among others. Single ended or push-pull amplifiers are connected to the nodes of the attenuator in such a manner that a signal will controllably propagate in one direction on the line to the exclusion of the other, or in both directions.

BRIEF DESCRIPTION OF THE DRAWINGS

The specific nature of the invention, as well as other aspects, uses and advantages thereof will clearly appear from the following description and from the accompanying drawings, in which:

FIGS. 1A and 1B are circuit diagrams of conventional, symmetrical $\pi$ and 0 attenuator networks, respectively, which are used to illustrate the principles of the invention;

FIG. 2A is a circuit diagram of one specific embodiment of a broad band directional signal generator according to the invention employing the symmetrical $\pi$ attenuator of FIG. 1A and two pairs of voltage to current converting amplifiers;

FIG. 2B is a circuit diagram of another specific embodiment of the invention employing a modified symmetrical $\pi$ attenuator network and a pair of push-pull voltage to current converting amplifiers;

DESCRIPTION OF THE PREFERRED EMBODIMENTS

Figure 2C:
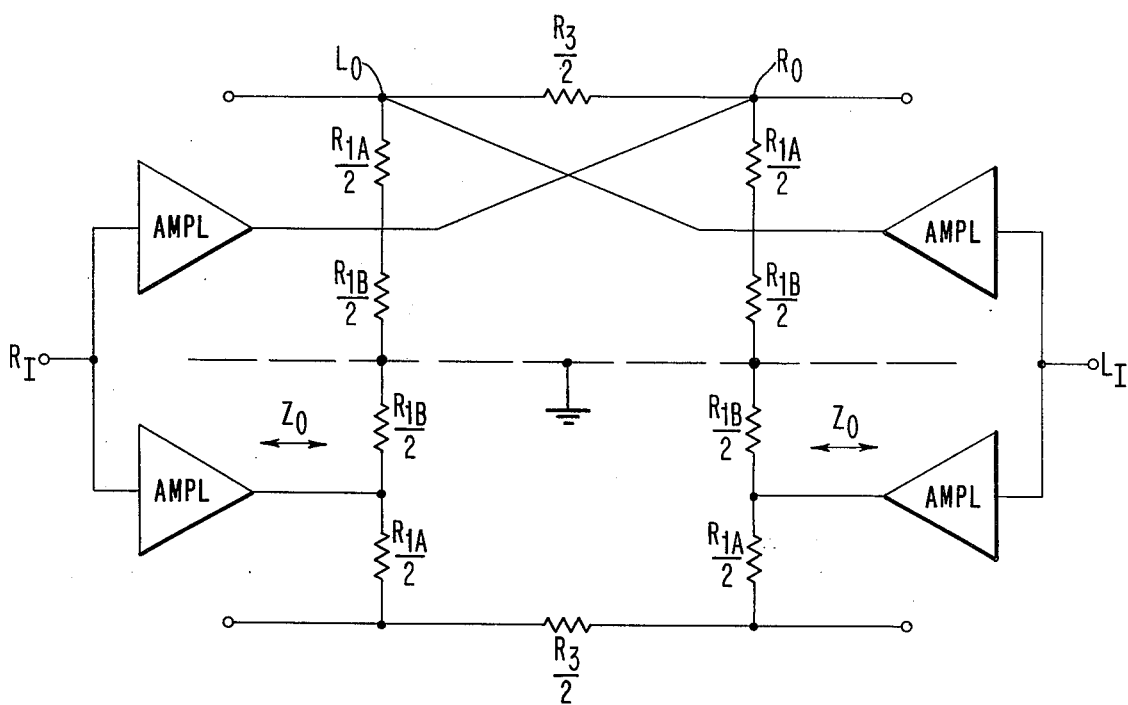
FIG. 2C illustrates an alternative embodiment of the invention employing a modified symmetrical 0 attenuator network and two pairs of voltage to current converting amplifiers.

For purposes of illustration only and in the interest of simplicity and clarity, the invention is illustratively described with reference to symmetrical $\pi$, 0, T, or H attenuator networks as shown in FIGS. 1A, 1B, 3A, and 3B. In any case, it will be appreciated by those skilled in the art from the following description that the principles of the invention are equally applicable to $\pi$, 0, T, or H networks which are not symmetrical. Referring first to FIGS. 1A and 1B, the series resistance $R_3$ and the shunt resistances $R_1$ are calcualted from the following equations:

$$R_3 = Z_0 \left( \frac{K^2 - 1}{2K} \right), \text{ and} \quad (1)$$

$$R_1 = Z_0 \left( \frac{K+1}{K-1} \right), \quad (2)$$

where $Z_0$ is the characteristic impedance of the transmission line, and K is the current or voltage ratio from the input to the output of the attenuator network hereinafter referred to as the attenuation factor. For the purposes of the following description, it is assumed that $Z_0 = 50$ ohms and $K = E_i/E_o = 2$ ($\approx$ 6dB) for which $R_1 = 150$ ohms and $R_3 = 37.5$ ohms. As will be seen, the magnitude of the attenuation provided by these attenuators is probably larger than that which would ordinarily be used in most applications; however, these relative values are useful to provide an illustrative numerical example.

Using the symmetrical $\pi$ attenuator network shown in FIG. 1A, a broad band directional signal generator can be constructed as shown in FIG. 2A. The attenuator may be considered a three terminal device having one terminal grounded. The node adjacent the left-hand terminal is labeled $L_o$, while the node adjacent the right-hand terminal is labeled $R_o$. The input nodes $R_I$ and $L_I$ are coupled to the nodes $L_o$ and $R_o$ of the attenuator network by isolation means such as voltage to current converting amplifiers. For the purpose of this description, it is assumed that the voltage to current converting amplifiers are perfect, that is, their input impedances are infinite, their output impedances are infinite, their transconductances are constant from DC upwards in frequency, and their delays are zero from DC upwards in frequency. Each input node $R_I$ and $L_I$ is connected to a pair of current to voltage converting amplifiers, the transconductances $g_1$ and $g_2$ of which are computed from the following equations:

$$g_1 = \left( \frac{2}{Z_0} \frac{K^2}{K^2 - 1} \right), \text{ and} \quad (3)$$

$$g_2 = -\frac{1}{Z_0}\left(\frac{2K}{K^2-1}\right). \tag{4}$$

assuming that an output voltage at nodes $R_o$ and $L_o$ equal to the input voltage at nodes $R_I$ and $L_I$, respectively, is desired.

The operation of the circuit shown in FIG. 2A is best visualized by a numerical example. Assume that the input nodes $R_I$ and $L_I$ are driven by sources which deliver either 0 volts or +1.5 volts. For these inputs, nodal voltages at nodes $R_I$, $L_I$, $R_o$, and $L_o$, and nodal current into nodes $L_o$ and $R_o$ are tabulated in Table I. In Table I, the convention has been adopted that currents flowing into the node are positive and currents flowing out of the node are negative. Thus, for example, for 1.5v at node $R_I$ and 0v at node $L_I$, a current of 40ma flows out of node $L_o$ to the amplifier with a transconductance of $g_2$, a current of 80ma flows into node $R_o$ from the amplifier with a transconductance of $g_1$, and a current of 40ma flows into node $L_o$ through the resistor $R_3$, assuming 50Ω for the characteristic impedance, $Z_0$.

TABLE I (FIG. 2)
(g in ma/v, $R_3 = 37.5Ω$, $R_1 = 150Ω$)

Nodal Voltages

| $R_I$ | $L_I$ | $L_o$ | $R_o$ |
|---|---|---|---|
| 1.5v | 0v | 0v | 1.5v |
| 0v | 1.5v | 1.5v | 0v |
| 1.5v | 1.5v | 1.5v | 1.5v |
| 0v | 0v | 0v | 0v |

$L_o$ Nodal Currents

| 50Ω | $g_2$ | $R_1$ | $g_1$ | $R_3$ |
|---|---|---|---|---|
| | 0ma | −40ma | 0ma | 0ma | +40ma |
| | −30ma | 0ma | −10ma | +80ma | −40ma |
| | −30ma | −40ma | −10ma | +80ma | 0ma |
| | 0ma | 0ma | 0ma | 0ma | 0ma |

$R_o$ Nodal Currents

| 50Ω | $g_2$ | $R_1$ | $g_1$ | $R_3$ |
|---|---|---|---|---|
| | −30ma | 0ma | −10ma | +80ma | −40ma |
| | 0ma | −40ma | 0ma | 0ma | +40ma |
| | −30ma | −40ma | −10ma | −80ma | 0ma |
| | 0ma | 0ma | 0ma | 0ma | 0ma |

Since all components of the circuits of FIG. 2A are linear and nonreactive and superposition applies, it is obvious that:

1. A signal equal in magnitude and polarity to any signal at input node $R_I$ appears at node $R_o$.
2. No signal appears at node $L_o$ for any signal at node $R_o$.
3. A signal equal in magnitude and polarity to any signal at node $L_I$ appears at node $L_o$.
4. No signal appears at node $R_o$ for any signal at node $L_o$.

The circuit shown in FIG. 2A is thus a broad band directional signal generator circuit whose frequency response is flat and flat to DC.

As indicated previously, the value of K = 2 assumed in the above description, is probably impractically large. Magnitudes of $R_1$, $R_3$, $g_1$, and $g_2$ for other magnitudes of K at $Z_0$ = 50 ohms are shown in Table II.

TABLE II

| K | $R_1$ (Ω) | $R_3$ (Ω) | $g_1$ (A/V) | $g_2$ (A/V) |
|---|---|---|---|---|
| 2.00 | 150 | 37.50 | 0.0533 | −0.0267 |
| 1.50 | 250 | 20.83 | 0.0720 | −0.0480 |
| 1.20 | 550 | 9.167 | 0.1309 | −0.1091 |
| 1.10 | 1050 | 4.773 | 0.2305 | −0.2095 |

TABLE II-continued

| K | $R_1$ (Ω) | $R_3$ (Ω) | $g_1$ (A/V) | $g_2$ (A/V) |
|---|---|---|---|---|
| 1.05 | 2050 | 2.440 | 0.4302 | −0.4098 |

The bandwidth of the circuit of FIG. 2A will be limited by the parasitic reactances associated with $R_1$ and $R_3$ and the amplifier bandwidth. In most cases the latter limitation will dominate.

Other circuits which are functionally equivalent to the circuit shown in FIG. 2A will readily suggest themselves to those skilled in the art. For example, the circuit of FIG. 2A can be simplified by modifying the π attenuator network as shown in FIG. 2B. This circuit requires only two amplifiers with push-pull outputs and uses the same π attenuator network shown in FIG. 1A except that the shunt impedances $R_1$ are divided into two series impedances $R_{1A}$ and $R_{1B}$ the values of which are computed as follows:

$$R_{1A} + R_{1B} = R_1, \tag{5}$$
$$R_{1A} = R_{1B}(K-1), \tag{6}$$

$$R_{1A} = R_1\left(\frac{K-1}{K}\right), \text{ and} \tag{7}$$

$$R_{1B} = R_1\left(\frac{1}{K}\right). \tag{8}$$

Further, where response down to DC is not required, the amplifiers may have transformer coupled outputs.

While the particular examples illustrated thus far employ symmetrical π attenuator networks, it will be immediately obvious to those skilled in the art that the principles of these examples are equally applicable to a broad band directional signal generator employing a symmetrical 0 attenuator network as illustrated in FIG. 2C. In this circuit, the 0 attenuator network may be viewed as the 90 attenuator network of FIG. 2B imaged about the ground, which may be either virtual or physical, indicated by the dotted line. Thus, nodes of opposite polarity with reference to ground permit the use of amplifiers having equal and positive transconductances thereby simplifying circuit design. Obviously, in a practical circuit, three of the series impedances in each shunt arm of the attenuator may be replaced by a single impedance having a value $$\frac{R_{1A} + 2R_{1B}}{2}.$$

It follows that the operation of the circuit of FIG. 2C is identical with that of FIGS. 2A and 2B.

Figure 3A:
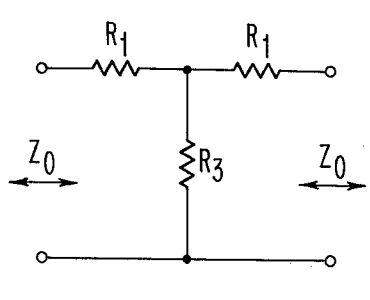
FIGS. 3A and 3B are circuit drawings of conventional, symmetrical T and H attenuator networks, respectively, which are used to illustrate the principles of the invention.
Figure 3B:
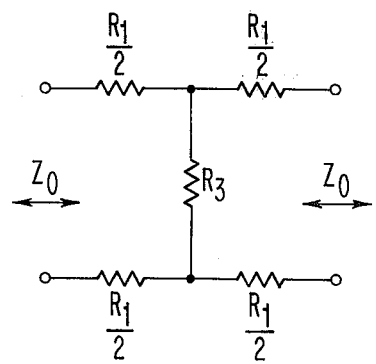

Next, referring to FIGS. 3A and 3B which show symmetrical T and H attenuator networks, the shunt resistance $R_3$ and the series resistances $R_1$ are calculated from the following equations:

$$R_3 = 2Z_0\left(\frac{K}{K^2-1}\right), \text{ and} \tag{9}$$

$$R_1 = Z_0\left(\frac{K-1}{K+1}\right). \tag{10}$$

Figure 4A:
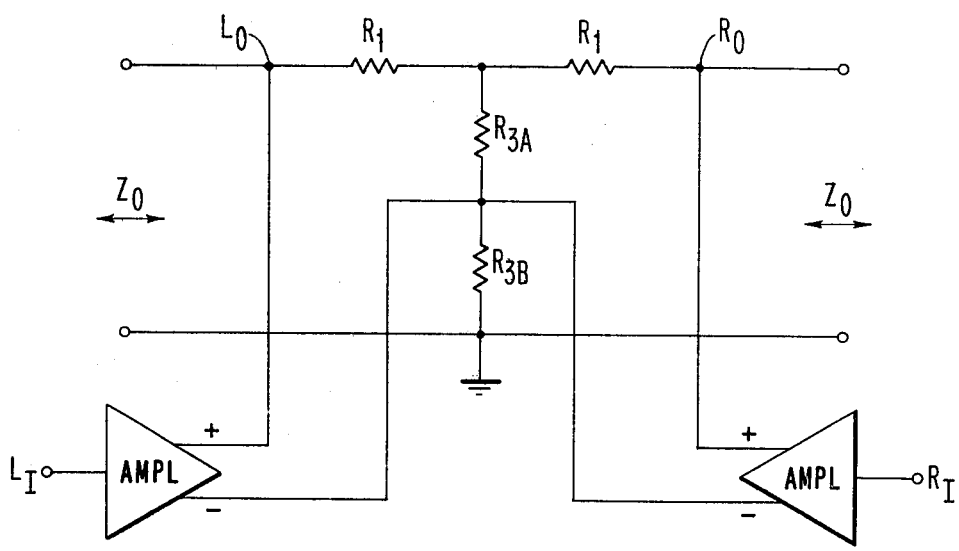
FIG. 4A illustrates a specific embodiment of the invention employing a modified symmetrical T attenuator network and a pair of push-pull amplifiers.
Figure 4B:
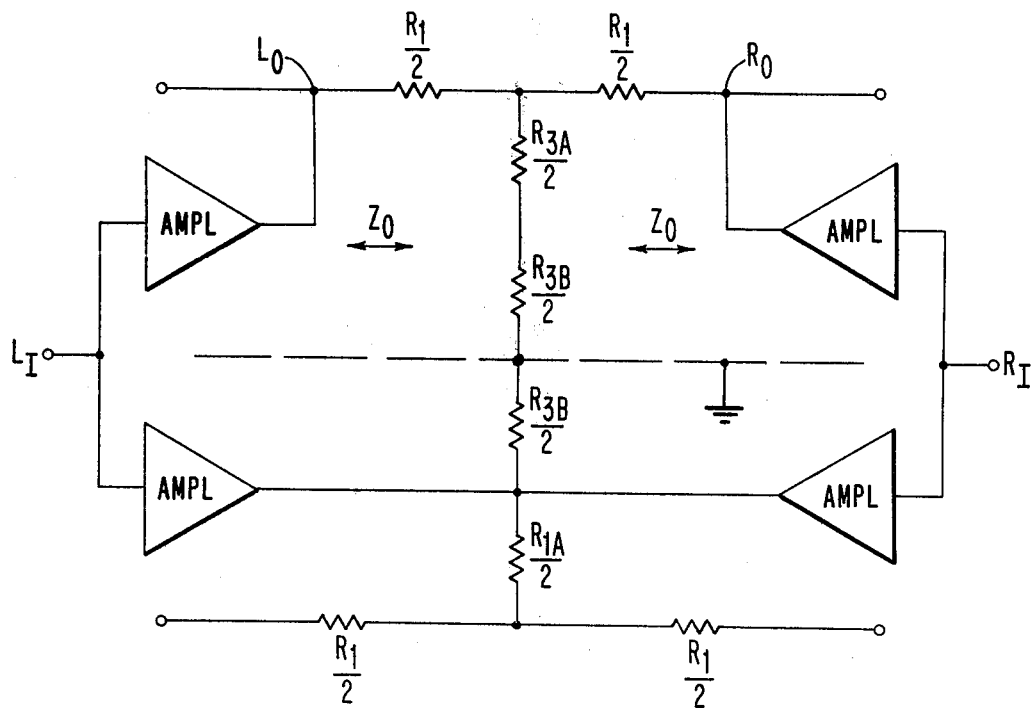
FIG. 4B illustrates an alternative embodiment of the invention employing a modified symmetrical H attenuator network and two pairs of amplifiers.

By comparing equations (9) and (10) with equations (1) and (2), the analogy to the π and 0 attenuator networks shown in FIGS. 1A and 1B is immediately obvious. Thus, the circuits shown in FIGS. 4A and 4B may be considered equivalents to the circuits shown in FIGS. 2B and 2C, respectively. Clearly, a similar circuit for FIG. 2A is readily apparent from a comparison of the foregoing figures. In FIGS. 4A and 4B, the circuit values are calculated from the following equations:

$$g_1 = \frac{2}{Z_0}\left(\frac{K}{K-1}\right), \quad (11)$$

$$g_2 = -\frac{1}{Z_0}\left(\frac{K+1}{K-1}\right), \quad (12)$$

if a circuit similar to FIG. 2A is desired, $$R_{3A} + R_{3B} = R_3 \quad (13)$$

$$R_{3A} = R_{3B}\left(\frac{K-1}{K+1}\right), \quad (14)$$

$$R_{3A} = R_3\left(\frac{K-1}{2K}\right), \text{ and} \quad (15)$$

$$R_{3B} = R_3\left(\frac{K+1}{2K}\right). \quad (16)$$

Assuming $Z_0 = 50$ ohms and $K = 2$ as before, $R_3 = 66.7$ ohms, $R_1 = 16.67$ ohms, $R_{3A} = 16.7$ ohms, $R_{3B} = 50$ ohms, $g_1 = 80$ ma/v, and $g_2 = -60$ ma/v.

The circuits described have applications in analog and digital communications paths where two-way information flow exists and where a multiplicity of ports may share the same path. The use of these circuits can reduce the number of signal wires required between devices which communicate with each other. While the specific embodiments disclosed employed symmetrical $\pi$, 0, T, and H attenuator networks, it will be obvious to those skilled in the art that the teachings of the invention are equally applicable to $\pi$, 0, T, or H attenuator networks which are not symmetrical. In addition, it will also be obvious that, while the specific embodiments disclosed employ voltage to current converting amplifiers or current sources, the teachings of the invention can be equally implemented with equivalent voltage sources. It will therefore be apparent that the embodiments shown are only exemplary and that various modifications can be made in construction and arrangement within the scope of the invention as defined in the appended claims.

What is claimed is:

1. A broad band directional signal generator for generating signals on a transmission line or the like which, controllably, propagate in one direction on the line due to reinforcement of signals to the exclusion of the other direction due to cancellation of signals, or simultaneously, in opposite directions, comprising:
    a. an attenuator network employing linear, nonreactive impedance elements for insertion in said transmission line, said impedance elements forming at least first and second nodes;
    b. at least a first input terminal for receiving a first signal which is to propagate in said one direction on said transmission line; and
    c. first isolation means for coupling said first input terminal to said first node and for coupling said first input terminal to said second node, said first isolation means coupling said first signal at said first input terminal to said first and second nodes in a first predetermined ratio to cause a signal proportional to said first signal to propagate on said line in said one direction to the exclusion of said other direction.

2. A broad band directional coupling circuit as recited in claim 1 further comprising a second input terminal for receiving a second signal which is to propagate in said other direction in said transmission line, and second isolation means for coupling said second input terminal to said second node and for coupling said second input terminal to said first node, said second isolation means coupling said second signal at said second input terminal to said second and first nodes in a second predetermined ratio to cause said second signal to propagate on said line in said other direction to the exclusion of said one direction.

3. A broad band directional coupling circuit as recited in claim 2 wherein said first and second isolation means each comprise active devices.

4. A broad band directional coupling circuit as recited in claim 3 wherein said attenuator network is a $\pi$ attenuator network having a series impedance and first and second shunt impedances and the junction of said series impedance with said first shunt impedance defines said first node and the junction of said series impedance with said second shunt impedance defines said second node.

5. A broad band directional coupling circuit as recited in claim 4 wherein said first isolation means provides differential amplification with a ratio of amplification factors corresponding to said first predetermined ratio, and said second isolation means provides differential amplification with a ratio of amplification factors corresponding to said second predetermined ratio.

6. A broad band directional coupling circuit as recited in claim 5 wherein said first isolation means comprises a first voltage to current converting amplifier having a first transconductance and a second voltage to current converting amplifier having a second transconductance, said first amplifier having its output connected to said first node and said second amplifier having its output connected to said second node, the inputs of said first and second amplifiers being coupled to said first input terminal, and wherein said second isolation means comprises a third voltage to current converting amplifier having a third transconductance and a fourth voltage to current converting amplifier having a fourth transconductance, said third amplifier having its output connected to said second node and said fourth amplifier having its output connected to said first node, the inputs of said third and fourth amplifiers being coupled to said second input terminal.

7. A broad band directional coupling circuit as recited in claim 6 wherein said attenuator network is symmetrical, said first and third transconductances are equal to a transconductance, $g_1$, and said second and fourth transconductances are equal to a transconductance, $g_2$, said transconductances being defined by the following equations:

$$g_1 = \frac{2}{Z_0}\left(\frac{K^2}{K^2-1}\right), \text{ and}$$

$$g_2 = -\frac{1}{Z_0}\left(\frac{2K}{K^2-1}\right),$$

where $Z_0$ is the characteristic impedance of the transmission line and K is the attenuation factor of the attenuator network.

8. A broad band directional coupling circuit as recited in claim 5 wherein said first and second shunt impedances are each comprised of two series impedances, the junctions of said two series impedances each defining third and fourth nodes, respectively, and wherein said first isolation means comprises a first push-pull amplifier having positive and negative outputs, the positive output of said first push-pull amplifier being connected to said first node and the negative output of said first push-pull amplifier being connected to said fourth node, and said second isolation means comprises a second push-pull amplifier having positive and negative outputs, the positive output of said second push-pull amplifier being connected to said second node and the negative output of said second differential amplifier being connected to said third node.

9. A broad band directional coupling circuit as recited in claim 8 wherein said attenuator network is symmetrical and said two series impedances have values, $R_{1A}$ and $R_{1B}$, defined by the following equations:

$$R_{1A} = R_1 \left(\frac{K-1}{K}\right), \text{ and}$$

$$R_{1B} = R_1 \left(\frac{1}{K}\right),$$

where $R_1$ is the value of each of said first and second shunt impedances and K is the attenuation factor of said attenuator network.

10. A broad band directional coupling circuit as recited in claim 3 wherein said attenuator network is a 0 attenuator network having first and second series impedances and first and second shunt impedances, and the junction of said first series impedance with said first shunt impedance defines said first node and the junction of said first series resistance with said second shunt impedance defines said second node.

11. A broad band directional coupling circuit as recited in claim 10 wherein said first isolation means provides differential amplification with a ratio of amplification factors corresponding to said first predetermined ratio, and said second isolation means provides differential amplification with a ratio of amplification factors corresponding to said second predetermined ratio.

12. A broad band directional coupling circuit as recited in claim 11 wherein said first and second shunt impedances are each comprised of two series impedances, the junctions of said two series impedances each defining third and fourth nodes, respectively, and wherein said first isolation means comprises first and second voltage to current amplifiers, the output of said first amplifier being connected to said first node and the output of said second amplifier being connected to said fourth node, and said second isolation means comprises third and fourth voltage to current amplifiers, the output of said third amplifier being connected to said second node and the output of said fourth amplifier being connected to said third node.

13. A broad band directional coupling circuit as recited in claim 3 wherein said attenuator network is a T attenuator network having a shunt impedance and first and second series impedances connected to a common node, said first series impedance being additionally connected to said first node and said second series impedance being additionally connected to said second node.

14. A broad band directional coupling circuit as recited in claim 13 wherein said first isolation means provides differential amplification with a ratio of amplification factors corresponding to said first predetermined ratio, and said second isolation means provides differential amplification with a ratio of amplification factors corresponding to said second predetermined ratio.

15. A broad band directional coupling circuit as recited in claim 14 wherein said shunt impedance is comprised of two series impedances, the junctions of said two series impedances defining a third node, and wherein said first isolation means comprises a first push-pull amplifier having positive and negative outputs, the positive input of said first push-pull amplifier being connected to said first node and the negative output of said first push-pull amplifier being connected to said third node, and said second isolation means comprises a second push-pull amplifier having positive and negative outputs, the positive output of said second push-pull amplifier being connected to said second node and the negative output of said second push-pull amplifier being connected to said third node.

16. A broad band directional coupling circuit as recited in claim 15 wherein said attenuator network is symmetrical and said two series impedances have values $R_{3A}$ and $R_{3B}$, defined by the following equations:

$$R_{3A} = R_3 \left(\frac{K-1}{2K}\right), \text{ and}$$

$$R_{3B} = R_3 \left(\frac{K+1}{2K}\right)$$

where $R_3$ is the value of said shunt impedance and K is the attenuation factor of said attenuation network.

17. A broad band directional coupling circuit as recited in claim 3 wherein said attenuator network is an H attenuator network having first and second series impedances and third and fourth series impedances and a shunt impedance, said shunt impedance being connected at one end to a first common junction with said first and second series impedances and at the other end to a second common junction with said third and fourth series impedances, said first series impedance being additionally connected to said first node and said second series impedances being additionally connected to said second node.

18. A broad band directional coupling circuit as recited in claim 17 wherein said first isolation means provides differential amplification with a ratio of amplification factors corresponding to said first predetermined ratio, and said second isolation means provides differential amplification with a ratio of amplification factors corresponding to said second predetermined ratio.

19. A broad band directional coupling circuit as recited in claim 18 wherein said shunt impedance is comprised of two series impedances, the junctions of said two series impedances defining a third node, and wherein said first isolation means comprises first and second voltage to current converting amplifiers, the output of said first amplifier being connected to said first node and the output of said second amplifier being connected to said third node, and said second isolation means comprises third and fourth voltage to current converting amplifiers, the output of said third amplifier being connected to said second node and the output of said fourth amplifier being connected to said third node.

* * * * *

UNITED STATES PATENT AND TRADEMARK OFFICE
CERTIFICATE OF CORRECTION

PATENT NO. : 3,935,480
DATED : January 27, 1976
INVENTOR(S) : Paul E. Stuckert

It is certified that error appears in the above--identified patent and that said Letters Patent are hereby corrected as shown below:

IN THE SPECIFICATION

Column 2, line 68 - delete "$g_1 = \left(\dfrac{2}{Z_0} \dfrac{K^2}{K^2-1}\right)$ , and (3)"

insert -- $g_1 = \dfrac{2}{Z_0} \left(\dfrac{K^2}{K^2-1}\right)$ , and (3) --

Column 4, line 39 - delete "90" and insert -- $\pi$ --

Signed and Sealed this eighth Day of June 1976

[SEAL]

Attest:

RUTH C. MASON
Attesting Officer

C. MARSHALL DANN
Commissioner of Patents and Trademarks